(12) United States Patent
Mathur et al.

(10) Patent No.: US 11,016,870 B2
(45) Date of Patent: May 25, 2021

(54) EXPONENTIAL DECAY REAL-TIME CAPACITY PLANNING

(71) Applicant: VMware, Inc., Palo Alto, CA (US)

(72) Inventors: Keshav Mathur, Mountain View, CA (US); Jinyi Lu, Mountain View, CA (US); Paul Pedersen, Palo Alto, CA (US); Junyuan Lin, Seattle, CA (US); Darren Brown, Seattle, WA (US); Peng Gao, Palo Alto, CA (US); Leah Nutman, Sunnyvale, CA (US); Xing Wang, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 188 days.

(21) Appl. No.: 16/419,174

(22) Filed: May 22, 2019

(65) Prior Publication Data

US 2020/0371896 A1 Nov. 26, 2020

(51) Int. Cl.
*G06F 9/50* (2006.01)
*G06F 11/34* (2006.01)
*G06N 5/04* (2006.01)
*G06F 11/30* (2006.01)

(52) U.S. Cl.
CPC ........ *G06F 11/3442* (2013.01); *G06F 9/5027* (2013.01); *G06F 11/3006* (2013.01); *G06F 11/3447* (2013.01); *G06N 5/048* (2013.01)

(58) Field of Classification Search
CPC .................................................... G06F 9/5027
See application file for complete search history.

(56) References Cited

U.S. PATENT DOCUMENTS

2015/0088955 A1\* 3/2015 Hendrick .......... G06F 16/24578
709/201
2018/0314616 A1\* 11/2018 Savolainen ......... G06F 11/3442

\* cited by examiner

*Primary Examiner* — Charlie Sun
(74) *Attorney, Agent, or Firm* — Thomas Horstemeyer, LLP

(57) ABSTRACT

Various examples are disclosed for forecasting resource usage and computing capacity utilizing an exponential decay. In some examples, a computing environment can obtain usage measurements from a data stream over a time interval, where the usage measurements describe utilization of computing resource. The computing environment can generate a weight function for individual ones of the usage measurements, where the weight function exponentially decays the usage measurements based on a respective time period at which the usage measurements were obtained. The computing environment can forecast a future capacity of the computing resources based on the usage measurements and the weight function assigned to the individual ones of the usage measurements. The computing environment can further upgrade a forecast engine to use the exponential decay without resetting the forecast engine or its memory.

20 Claims, 14 Drawing Sheets

$$\underbrace{\min}_{206} \underbrace{\Sigma \ (\overbrace{x_i}^{135} - \overbrace{f(x_i)}^{203})^2}_{209} \swarrow_{200}$$

FIG. 2

$$\underbrace{\min}_{306} \underbrace{\Sigma \ \overbrace{c^{n-i}}^{137} (\overbrace{x_i}^{135} - \overbrace{f(x_i)}^{303})^2}_{309} \swarrow_{300}$$

FIG. 3

$$\min f(\mu) = \Sigma\, c^{r-i}(x_i - \mu)^2$$
— 403

$$\min f(\alpha, \beta) = \Sigma\, c^{r-i}(x_i - \alpha - \beta i)^2$$
— 406

$$\min f(\sigma) = \Sigma\, c^{r-i}((x_i - \mu_x)^2 - \sigma)^2$$
— 409

$$S = \Sigma_i\, c^{r-i}(x_i - trend_i)^2$$
— 412

$\gamma_j = \Sigma\, c^{r-i} x_i x_{i-j}$ is the j-th exponentially decaying moment
— 415

FIG. 4

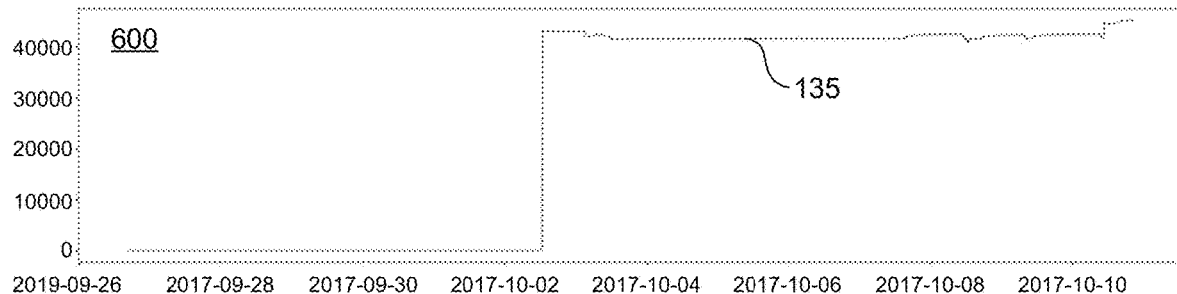
FIG. 6A
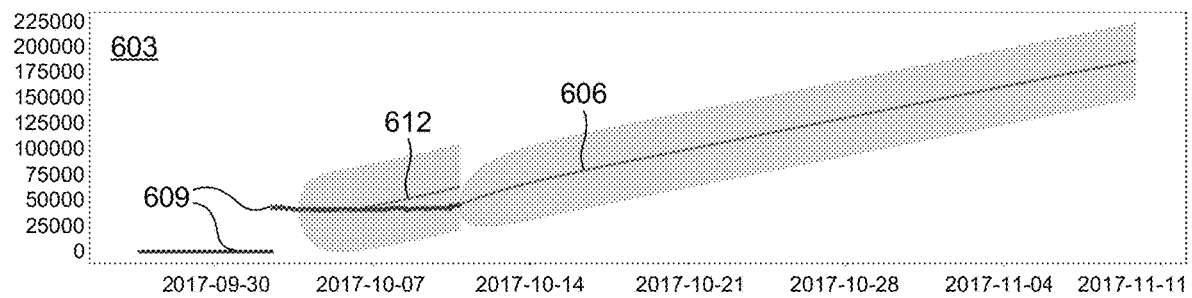
FIG. 6B  Without Exponential Decay
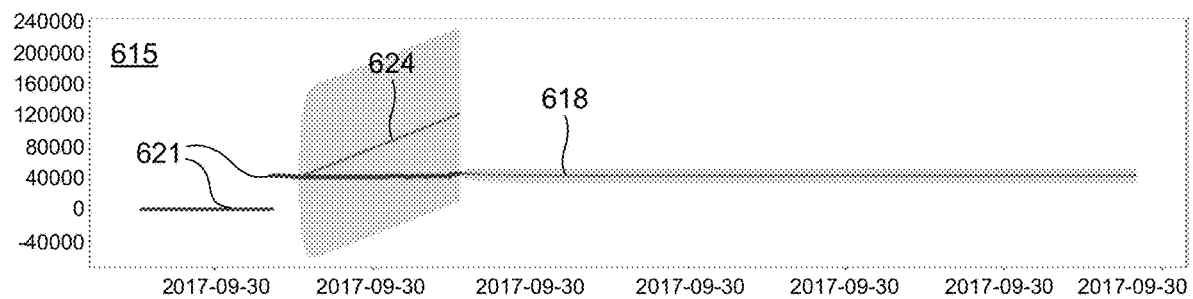
FIG. 6C  With Exponential Decay

EXPONENTIAL DECAY REAL-TIME CAPACITY PLANNING

BACKGROUND

Data centers include various physical and virtual components that, when executed, provide web services, cloud computing environments, virtualization environments, as well as other distributed computing systems. For instance, data centers can include hardware and software to provide computer virtualization services, which relate to the creation of a virtualized version of a physical device, such as a server, a storage device, a central processing unit (CPU), a graphics processing unit (GPU), or other computing resources. Data centers can also include virtual machines (VMs), which include emulations of a computer system that can be customized to include a predefined amount of random access memory (RAM), hard drive storage space, as well as other computing resources that emulate a physical machine.

As the components of a data center are critical for operating computing services, various management applications have arisen that permit administrators and other personnel to oversee operation of computing services. For instance, administrators can interact with an administrator console to ensure that computing services operate without interruption by allocating computing resources to various services. To allocate adequate computing resources to a computing service, some management applications forecast resource usage to assist administrators with capacity planning as well as allocating sufficient computing resources. However, forecasting resource usage in distributed computing environments remains problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2, 3, and 4 are loss functions that can be used in a data model for forecasting resource usage in the networked computing environment.

FIG. 6A is a graph showing past usage of computing resources.

FIG. 6B is a graph showing a forecast of computing resources determined for the past usage shown in FIG. 6A, where the forecast is generated without use of an exponential decay.

FIG. 6C is a graph showing a forecast of computing resources determined for the past usage shown in FIG. 6A, where the forecast is generated using an exponential decay weight function.

DETAILED DESCRIPTION

Figure 1:
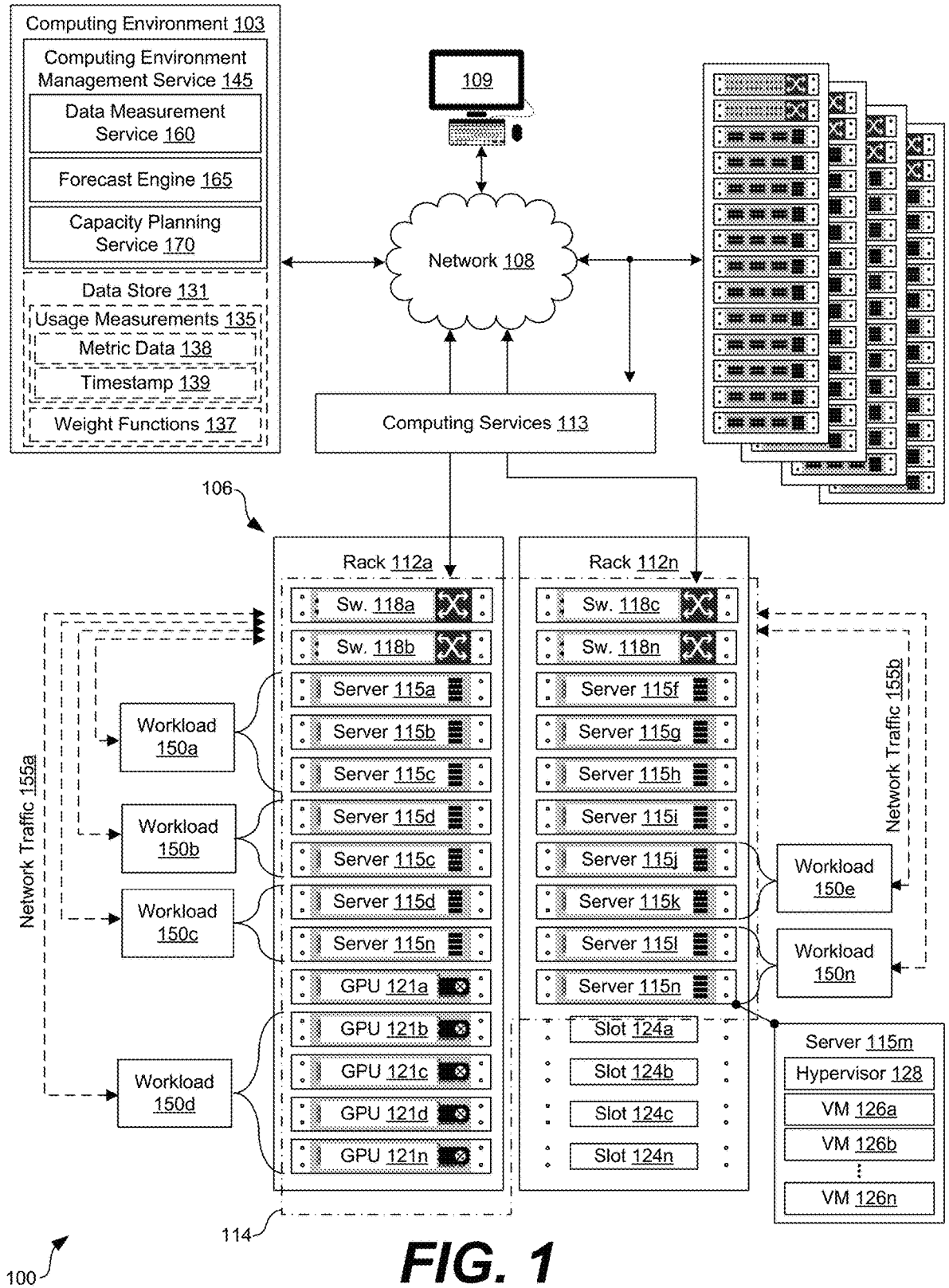
FIG. 1 is a drawing of an example of a networked computing environment having a data measurement service and a forecast engine for forecasting computing resource usage of the networked computing environment.

The present disclosure relates to forecasting resource usage in computing service capacity planning using an exponential decay. Various management and capacity planning services offer the ability to predict usage of computing resources such that administrators and automated capacity planning services can ensure that computing services are provided with sufficient computing resources. To do so, forecast engines predict usage based on forecasting models that rely on past usage of computing resources. However, traditional forecast engines are unable to forecast accurate measurements when substantial changes in usage occurs in a relatively short period of time.

For instance, an enterprise can launch a new application or computing service that gains widespread popularity or use, requiring the enterprise to provide sufficient computing resources such that the new application or computing service operates without interruption. Notably, the increase in new usage of the computing service over a short period of time can cause usage of computing resources to dramatically increase. For instance, additional memory, disk space, or CPU resources can be required such that the application or service can operate. Administrators or capacity planning services that automatically rebalance workloads can rely on forecasted usage to allocate more computing resources to adapt to the increase in usage.

However, forecast engines generally predict future usage using data models that consider measurements obtained over a time interval equally regardless of when the measurements were obtained, insufficiently accounting for substantial increases or decreases in resource usage, especially those occurring in a short period of time. Forecast engines thus generate a forecasted usage of computing resources that can be inaccurate. As a result, administrators or capacity planning services likely would allocate insufficient resources, which can cause the computing service to fail or operate using limited computing resources.

Accordingly, in some examples, a forecast engine is described that generates a weight function that causes older usage measurements to have a weight exponentially lower than more recent usage measurements. As a result, dramatic changes in a computing environment can be accounted for more quickly in usage forecasts and allocating sufficient computing resources, resulting in improvements to the usage of computing resources in a data center or other computing environment and further preventing service downtime.

Various examples are described herein for collecting measurements and forecasting usage of computing systems in computing facilities, such as data centers, cloud-computing facilities, and other distributed computing systems. In one example, a forecast engine can obtain various usage measurements detailing usage of computing resources over a time interval, such as a day, week, month, six-months, or other suitable time interval. The forecast engine can generate a weight function for individual ones of the usage measurements. In some examples, the forecast engine generates the weight function to exponentially decay usage measurements based on a respective time at which the usage measurements were obtained. As a result, more recent ones of the usage measurements are assigned a weight greater than older ones of the usage measurements when forecasting usage. The more recent ones of the usage measurements can be more indicative of a current state of use of a computing resource. Thereafter, the forecast engine can forecast a future capacity of the computing resources based on the usage measurements and the weight function assigned to the individual ones of the usage measurements.

Additionally, various examples are described for transitioning a forecast engine between a legacy forecast model and a new forecast model that implements exponential decay. When a capacity planning service has been launched, data objects are operational and running in memory, where the data objects maintain usage states and statistics associated with usage measurements received from a data stream. For instance, the data objects can include one or more accumulators that accrue usage measurements, or statistics pertaining thereto, over a time interval. As computing environments require nearly 100% uptime, it is not ideal to erase or reload history that has been stored in the data objects, nor is it desirable to terminate execution of the forecast engine as a data stream will continue to provide usage measurements. As such, various examples are described herein for transitioning the forecast engine to an exponential decay model without incurring downtime, loss of data, or a reloading of data.

In various examples, the computing environment can detect a transition of a forecast engine using a first data model to a forecast engine using a second data model, where the second data model includes an exponential decay weight function. The transition can include an upgrade of the forecast engine from a first version to a second version, in some examples. The computing environment can maintain accumulators for use in forecasting usage with the first data model and exponentially decay use of these accumulators over time.

At a time of upgrade when the forecast engine is transitioned for a first data model to a second data model that includes an exponential decay weight function, the computing environment can initialize new accumulators. The new accumulators can receive new usage measurements in a data stream. As usage measurements are received in a stream of usage measurements, the computing environment can exponentially decay the accumulators used in forecasting usage based on the first data model until those accumulators are not used in subsequent forecasts of usage by the forecast engine.

Thus, as soon as a customer upgrades the forecast engine to the second data model, the results appear exactly as they did prior to the update. In other words, the administrator does not see an immediate impact on capacity planning as that could interfere with operating the computing services. However, as more usage measurements are received from the data stream, the accumulators are decayed exponentially such that that, over a certain time period, forecasted usage results in a transition to computations that employ the exponential decay weight function.

Turning now to FIG. 1, an example of a networked environment 100 is shown. The networked environment 100 can include a computing environment 103 and various computing systems 106 in communication with one other over a network 108. The network 108 can include, for example, the Internet, intranets, extranets, wide area networks (WANs), local area networks (LANs), wired networks, wireless networks, other suitable networks, or any combination of two or more such networks.

The networks of the networked environment 100 can include satellite networks, cable networks, Ethernet networks, telephony networks, and other types of networks. The computing systems 106 can include devices installed in racks 112a . . . 112n (collectively "racks 112"), which can make up a server bank, aggregate computing system, or a computer bank in a data center or other like facility. In some examples, the computing systems 106 can include high-availability computing systems. A high-availability computing system is a group of computing devices that acts as a single system and provides a continuous uptime. The devices in the computing systems 106 can include any number of physical machines, virtual machines, virtual appliances, and software, such as operating systems, drivers, hypervisors, scripts, and applications.

The computing systems 106 and the various hardware and software components contained therein can include infrastructure of the networked environment 100 that can provide one or more computing services 113. Computing services 113 can include virtualization services in some examples. For instance, the computing services 113 can include those that serve up virtual desktops to end users. Thus, the computing environment 103 can also be described as a virtual desktop infrastructure (VDI) environment in some examples. In other examples, the computing services 113 can include those that provide a public cloud computing environment, a private cloud computing environment, or a hybrid cloud computing environment (a combination of a public and private cloud computing environment). As such, the computing environment 103 can be referred to as a cloud computing environment in some examples.

In various examples, the computing environment 103 can include an enterprise computing environment that includes hundreds or even thousands of physical machines, virtual machines, and other software implemented in devices stored in racks 112, distributed geographically, and connected to one another through the network 108. As such, the computing environment 103 can be referred to as a distributed computing environment in some examples. It is understood that any virtual machine or virtual appliance is implemented using at least one physical device, such as a server or other computing device.

The devices in the racks 112 can include various computing resources 114. The computing resources 114 can include, for example, physical computing hardware, such as memory and storage devices, servers 115a . . . 115n, switches 118a . . . 118n, graphics cards (having one or more GPUs 121a . . . 121n installed thereon), central processing units (CPUs), power supplies, and similar devices. The devices, such as servers 115 and switches 118, can have dimensions suitable for quick installation in slots 124a . . . 124n on the racks 112. In various examples, the servers 115 can include requisite physical hardware and software to create and manage virtualization infrastructure or a cloud computing environment. Also, in some examples, the computing resources 114 can also include virtual computing resources, such as virtual machines or other software.

Further, in some examples, the servers 115 can include a pre-configured hyper-converged computing device where a hyper-converged computing device includes pre-tested, pre-configured, and pre-integrated storage, server and network components, including software, that are positioned in an enclosure installed in a slot 124 on a rack 112. Additionally, if a server 115 includes an instance of a virtual machine, the server 115 can be referred to as a "host" while the virtual machine can be referred to as a "guest."

Each server 115, such as representative server 115m, can act as a host in the networked environment 100, and thereby can include one or more virtual machines 126a . . . 126n (collectively "virtual machines 126"). In some examples, a hypervisor 128 can be installed on a server 115 to support a virtual machine execution space within which one or more virtual machines 126 can be concurrently instantiated and executed. The hypervisor 128 can include the ESX™ hypervisor by VMware®, the ESXi™ hypervisor by VMware®, or similar hypervisor 128, in some examples. It is understood that the computing systems 106 can be scalable, meaning that the computing systems 106 in the networked environment 100 can increase or decrease dynamically to include or remove servers 115, switches 118, GPUs 121, power sources, and other components without downtime or otherwise impairing performance of the computing services 113 offered up by the computing systems 106.

One or more computing services 113 can be provided through execution of an application or service on one or more of the virtual machines 126. The computing services 113 can include, for example, web services that can be invoked through an application programming interface (API) by submitting requests over the network 108 for particular actions to be performed or for particular data to be returned. Additionally, in some examples, the computing services 113 can be implemented in computing containers, where each of the containers can include a self-contained execution environment having its own CPU, memory, block input/output (I/O), and network resources which is isolated from other containers.

The computing environment 103 can include, for example, a server or any other system providing computing capability. Alternatively, the computing environment 103 can include one or more computing devices that are arranged, for example, in one or more server banks, computer banks, computing clusters, or other arrangements. The computing environment 103 can include a grid computing resource or any other distributed computing arrangement. The computing devices can be located in a single installation or can be distributed among many different geographical locations. The computing environment 103 can include or be operated as one or more virtualized computer instances in some examples. Although shown separately from the computing systems 106, it is understood that in some examples the computing environment 103 can be included as all or a part of the computing systems 106.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the computing systems 106 and client devices 109 over the network 108, sometimes remotely, the computing environment 103 can be described as a remote computing environment 103 in some examples. Additionally, in various examples, the computing environment 103 can be implemented in servers 115 of a rack 112 and can manage operations of a virtualized or cloud computing environment through interaction with the computing services 113.

The computing environment 103 can include a data store 131. The data store 131 can include memory of the computing environment 103, mass storage resources of the computing environment 103, or any other storage resources on which data can be stored by the computing environment 103. The data store 131 can include memory of the servers 115 in some examples. For instance, the data store 131 can include one or more relational databases, such as structure query language (SQL) databases, non-SQL databases, or other relational or non-relational databases. The data stored in the data store 131, for example, can be associated with the operation of the various services or functional entities described below.

The data store 131 can include a database or other memory that includes, for example, usage measurements 135, weight functions 137, as well as other data not discussed herein. The usage measurements 135 can include data describing operation of a computing system 106 or computing service 113. For instance, the usage measurements 135 can include metric data 138 describing usage of computing resources 114 by a respective one of the computing systems 106 or computing services 113. To this end, metric data 138 can include one or more metrics describing an amount of usage of a disk, memory, CPU, GPU, or other computing resource 114 by a computing service 113 at a given point in time. The disk, memory, CPU, GPU, and other computing resource 114 can include a physical resource, virtual resource, or combination thereof. Additionally, the usage measurements 135 can include a timestamp 139 reflecting a time at which the usage measurement 135 or metric data 138 was generated or obtained.

The weight functions 137 can include a function that assigns a value, referred to as a weight, to a respective one of the usage measurements 135 when forecasting future usage of a computing resource 114. According to various examples described herein, the weight functions 137 can include an exponential decay component that assigns a weight to respective ones of the usage measurements 135 such that newer ones of the usage measurements 135 have more influence on a capacity forecast relative to older ones of the usage measurements 135.

The components executed on the computing environment 103 can include, for example, a computing environment management service 145 as well as other applications, services, processes, systems, engines, or functionality not discussed in detail herein. The computing environment management service 145 can oversee the operation of the networked environment 100 through management of the computing systems 106 as well as the physical and virtual computing resources 114 that make up the computing systems 106. In some examples, an enterprise, organization, or other entity can operate the computing environment management service 140 to oversee or manage the operation of devices in the racks 112, such as servers 115, switches 118, GPUs 121, power supplies, cooling systems, and other components.

The computing environment management service 140 can include an administrator console that allows administrators of various enterprises to configure various settings and rules for the computing systems 106 and the computing services 113. For example, in an instance in which an enterprise uses the computing environment management service 140 to provide virtual desktops to employees of the enterprise, the computing environment management service 140 can serve up an administrator portal that allows an administrator to define a number of virtual desktops available to client devices 109 and allocate computing resources 114 to the virtual desktops. For instance, the administrator can allocate a certain amount of disk space, memory, CPU resources, GPU resources, and other computing resources 114 to offer virtualization services by way of the computing service 113. As an enterprise is charged with the amount of computing resources 114 used, it is understood that the administrator may not want to allocate computing resources 114 substantially more than what it used in offering up the computing services 113.

The various physical and virtual components of the computing systems 106 can process workloads 150a . . . 150n. Workloads 150 can refer to the amount of processing that a server 115, switch 118, GPU 121, or other physical or virtual component has been instructed to process or route at a given time. The workloads 150 can be associated with virtual machines 126, public cloud services, private cloud services, hybrid cloud services, virtualization services, device management services, or other software executing on the servers 115. For instance, the workloads 150 can include tasks to be processed to provide employees of an enterprise with remote desktop sessions or other virtualized computing sessions.

The computing environment management service 140 can maintain a listing of active or inactive workloads 150 as well as oversee the assignment of various workloads 150 to various devices in the computing systems 106. For instance, the computing environment management service 140 can assign a workload 150 lacking available resources to a server 115 that has resources sufficient to handle the workload 150. The workloads 150 can be routed to various servers 115 by the switches 118 as network traffic 155a . . . 155b.

In some examples, the computing environment management service 145 can include a data measurement service 160, a forecast engine 165, a capacity planning service 170, as well as other applications or services not described herein. The data measurement service 160 can retrieve, generate, and store usage measurements 135 describing usage of computing resources 114 by virtual and physical components of the computing systems 106. In some examples, the data measurement service 160 generates usage measurements 135 describing disk, memory, CPU, and GPU usage for one or more computing services 113. The data measurement service 160 can generate a data stream of usage measurements 135 that can be used by other applications, engines, and services. In some examples, the data measurement service 160 can generate a usage measurement 135 for a computing service 113 periodically, such as every five minutes or other suitable time, and push the usage measurement 135 to the data stream.

In some examples, the data measurement service 160 can generate multiple data streams including different types of usage measurements 135. For instance, one or more of the data streams can include usage measurements 135 describing core usage, memory usage, network throughput, network traffic, amount of storage in use, hard drive active time, and hard disk transfer rate. Core usage can include a measure of processor time used to process instructions of an application program or operating system as a percentage of core capacity. The amount of memory is the amount of memory, such as gigabytes (GBs), a computer system, or other device uses at a given time. Network throughput can include a number of bits of data transmitted to and from a server 115 or data-storage device per unit of time and is often recorded in megabits, kilobits, or simply bits per second. Network traffic at a server computer or mass-storage array can include a count of the number of data packets received and sent at a given time.

The forecast engine 165 can access usage measurements 135 from one or more of the data streams to forecast usage of computing resources 114 required by the computing services 113 at a future time. To forecast usage of the computing resources 114, the forecast engine 165 can assign weights or weight functions 137 to individual ones of the usage measurements 135 such that older ones of the usage measurements 135 are not weighed too heavily, impairing the usage forecast, as will be discussed. Further, in some examples, one or more virtual machines 126 in a data center can provide execution environments that support execution of the data measurement service 160, tasked with collecting and storing metric data regularly generated by other virtual machines, the forecast engine 165, the capacity planning service 170, and additional virtual and physical components of the data center.

The capacity planning service 170 can plan acquisition and provisioning of computing resources 114 to satisfy future demand and reclaim underutilized computing resources 114. For instance, the capacity planning service 170 can enable an administrator to define peak resource usage by selecting a time window of historical usage data to assess past resource usage and determine a threshold above which future demand would be considered peak usage or stress on a computing resource 114. In some examples, the capacity planning service 170 can determine a mean or maximum peak usage for a computing resource 114, discovered in historical metric data, which can be used to set a threshold and drive capacity planning recommendations for the computing resource 114.

Referring now to FIG. 2, an example of a loss function 200 is shown according to various examples. The loss function 200 shown in FIG. 2 includes a mean-squared-error (MSE) loss function that measures the quality of a predictor function 203 (f($x_i$)) relative to a usage measurement 135 generated or received by the data measurement service 160. The loss function 200 can be expressed as an optimization problem, where a "min" component 206 refers to minimizing the loss between an actual measured value and a forecasted value generated by the forecast engine 165. The usage measurement 135, $x_i$, refers to a metric value recorded at a given time i. A summation 209, E, adds the losses over different measurements.

The forecast engine 155 can use the loss function 200 for parameter estimation by minimizing a loss resulting between forecasted usage values generated by the forecast engine 165 and actual metric data 138 of the usage measurements 135. By minimizing the loss, the forecast engine 165 can forecast an amount of memory, disk, CPU, or other computing resource 114 required to execute a computing service 113 without interruption. For instance, parameters resulting in a smallest accumulated error can be determined and used to compute forecasted usage. However, the loss function 200 in FIG. 2 does not include a weighted loss function. As a result, each of the usage measurements 135 have equal consideration in the loss function, although some of the usage measurements 135 may not reflect a current state of usage.

Figure 5:
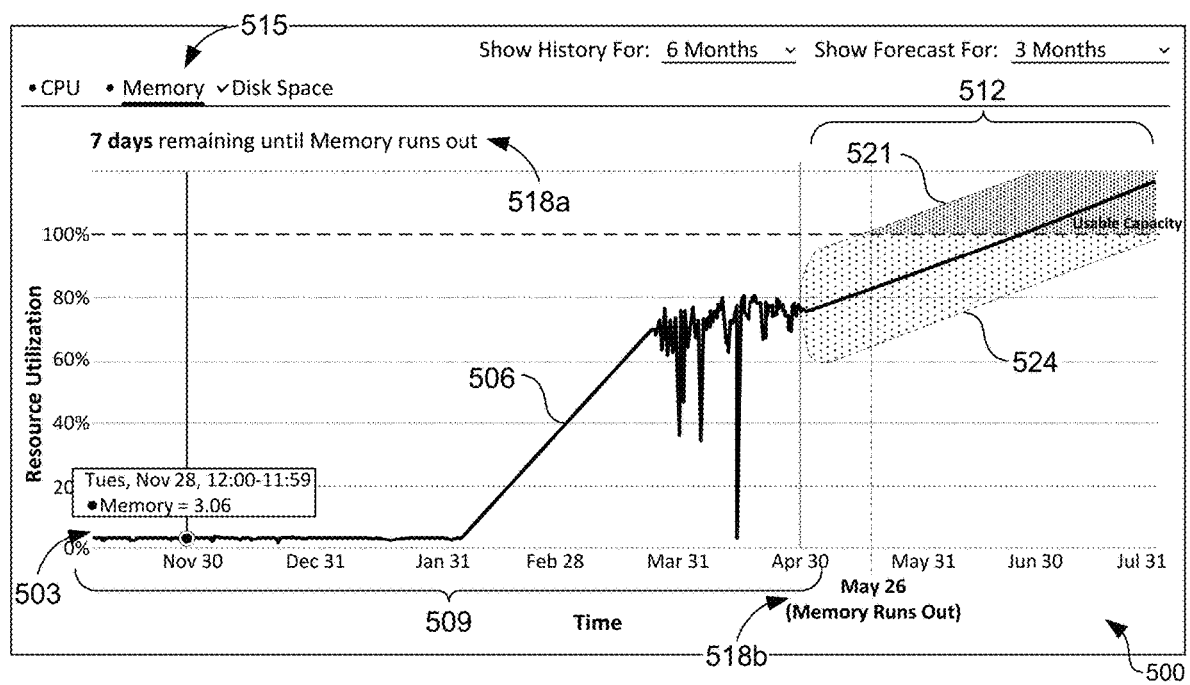
FIG. 5 is a user interface that details past usage and forecasted usage of a computing resource.

As each of the usage measurements 135 are weighted equally in the loss function 200 of FIG. 2, the forecast of usage of computing resources 114 can result in inaccurate forecasts. For instance, if usage of a computing service 113 increases substantially in a short period of time, usage of computing resources 114 will spike as well, as shown in FIG. 5. Referring back to FIG. 2, however, a forecasted amount of computing resources 114 required to handle the increase in usage of the computing service 113 will be inaccurate as older ones of the usage measurements 135 are considered equally to newer ones of the usage measurements 135, although newer ones of the usage measurements 135 may be more representative of a current state of usage of a computing resource 114.

Turning next to FIG. 3, another example of a loss function 300 is shown according to various examples. Similar to the loss function 200 of FIG. 2, the loss function 300 of FIG. 3 includes an MSE loss function that measures the quality of a predictor function 303 (f($x_i$)) relative to a usage measurement 135 generated by the data measurement service 160. Also, like the loss function 200 of FIG. 2, the loss function 300 of FIG. 3 can be expressed as an optimization problem, where a "min" component 306 refers to minimizing the loss between an actual measured value and a forecasted value generated by the forecast engine 165. A summation 309, Σ, adds the losses over different measurements.

As shown in FIG. 3, the weight function 137 can include an exponential weight function:

$$c^{n-i} \quad \text{(eq. 1)},$$

where n is the total number of usage measurements 135 in a time interval and i=1 . . . n. As a value of i increases (and the usage measurements 135 get older based on their timestamp 139), the weight function 137 will generate an increasingly lower weight.

In contrast to FIG. 2, the loss function 300 of FIG. 3 includes a weight function 137. The forecast engine 165 can determine the weight function 137 for individual ones of the usage measurements 135 such that new ones of the usage measurements 135 in a time interval are assigned a weight exponentially higher than older ones of the usage measurements 135, for instance, based on a timestamp 139 generated for each of the usage measurements 135. As a result, administrators or other personnel are able to assign more weight to recent changes in the computing environment 103.

For example, assume that usage measurements 135 are obtained over a period of a year for computing resources 114 used by AlphaCo in offering one or more computing services 113. The usage measurements 135 indicate that usage of the computing resources 144 was relatively low for the twelve months. Assume now, that in the last month AlphaCo launched a new application or computing service 113 that causes usage of the computing resources 114 to dramatically increase. An administrator for AlphaCo, or the capacity planning service 170 used by AlphaCo, would rely on the forecast and allocate additional computing resources 114 to adapt to the increase in usage.

However, if the forecast engine 165 were to forecast usage by using equal weights for each of the usage measurements 135 obtained over the past twelve months, the forecasted usage can be inaccurate. Older ones of the usage measurements 135 can weigh down the forecasted usage. As a result, the administrator or the capacity planning service can allocate insufficient resources, which causes the computing service 113 to fail or operate using limited resources. Conversely, if the forecast engine 165 generates and uses a weight function 137 that causes older ones of the usage measurements 135 to have a weight exponentially lower than new ones of the usage measurements 135, dramatic changes in a computing environment 103 can be accounted for more quickly in usage forecasts and allocations of computing resources 114.

In addition to the loss function 300 of FIG. 3, the forecast engine 165 can employ additional functions to forecast usage of computing resources 114, as shown in FIG. 4, such as a mean function 403, a linear trend function 406, a mean variance function 409, a trend variance function 412, and an auto-covariance function 415. For example, the mean function 403 can be used to determine the mean peak resource usage and maximum peak resource usage from historical usage measurements 135, which can be used to drive capacity planning and make recommendations for a computing resource 114.

Moving on to FIG. 5, an example of a user interface 500 is shown according to various examples. The capacity planning service 170 or similar service can generate an administrator console that permits administers or other personnel to view past resource usage. Additionally, the user interface 500 can permit administrators to view forecasted usage determined by the forecast engine 165. To this end, the user interface 500 can include a graph 503 that plots past usage and forecasted usage ("resource utilization") over time.

While the past usage includes discrete values of usage measurements 135 collected at predetermined times, the graph 503 can generate a line 506 that appears continuous by connecting the discrete values. For instance, the computing environment 103 can use interpolation to fill in any gaps or missing usage measurements 135. To perform interpolation, the computing environment 103 can employ various interpolation techniques to fill in missing usage measurements 135, such as linear interpolation, polynomial interpolation, and spline interpolation.

As shown in FIG. 5, a first portion 509 of the line 506 can correspond to usage measurements 135 obtained by the data measurement service 160 while a second portion 512 of the line 506 can correspond to forecasted usage. The user interface 500 can further include a navigation bar 515 that permits the administrator to toggle between graphs 503 generated for different computing resources 114, such as CPU, memory, disk space, or like computing resource 114. As the "memory" feature of the navigation bar 506 is shown as being selected in FIG. 5, it is understood that the graph 503 includes past and future usage of memory utilized by one or more computing services 113. Notably, the graph 503 shows a substantial increase in usage of memory occurring on or shortly after January 31$^{st}$.

In some examples, the administrator can access the user interface 500 to oversee operation of the computing services 113. For instance, the administrator can access an administrator console to analyze current or past usage and determine whether to allocate additional computing resources 114. Based on the forecasted usage, the user interface 500 can include time remaining components 518a, 518b. For instance, the time remaining components 518 can specify a time at which the computing resources 114 will "run out" (or deplete) based on the forecasted usage. In the non-limiting example of FIG. 5, the user interface 500 indicates that seven days remains until the memory allocated to a computing service 113 runs out. To assist with the determination of whether to allocate additional computing resources 114, in this case additional memory, the second portion 512 of the graph 503 can include an upper bound 521 and a lower bound 524 which can correspond to error thresholds. The time remaining components 518 and the generation of the line 506 are further described in U.S. patent application Ser. No. 16/180,411 (Attorney Docket No.: E171.CIP.03) entitled "METHODS AND SYSTEMS FOR ESTIMATING TIME REMAINING AND RIGHT SIZING USABLE CAPACITIES OF RESOURCES OF A DISTRIBUTED COMPUTING SYSTEM, filed on Nov. 5, 2018, the contents of which being incorporated by reference in their entirety herein.

Various experiments were performed that utilized actual usage measurements 135 obtained by the data measurement service 160. Turning now to FIG. 6A, a chart 600 is shown that plots resource utilization over time. Notably, in FIG. 6A, a spike in usage occurs shortly after Oct. 2, 2017. For instance, an enterprise can potentially launch a new workload 150 on a computing system 106 that causes a spike in usage of computing resources 114.

In FIG. 6B, a chart 603 is shown using values generated by a legacy type of forecast engine 165 that inaccurately forecasted usage, for instance, by employing the loss function 200 of FIG. 2. Notably, the forecasted usage was generated based on historical usage measurements 135 where the usage measurements 135 were equally considered, and an exponential decay was not used. The chart 603 includes a forecasted usage line 606, a ground truth line 609, and a long-term forecasted usage line 612. The forecasted usage line 606 and/or the long-term forecasted usage line 612 can be made up of forecasted usage values generated by the forecast engine 165, where usage measurements 135 are weighed equally. As can be seen between a comparison of the ground truth line 609 relative to the forecasted usage line 606 and the long-term forecasted usage line 612, a substantial variation exists between the actual usage and forecasted usage.

In FIG. 6C, however, a chart 615 is shown using values generated by the forecast engine 165 that forecasts usage in accordance with the examples described herein. For instance, the forecast engine 165 can employ the loss function 300 of FIG. 3 where older ones of the usage measurements 135 are exponentially decayed relative to newer ones of the usage measurements 135. As such, the chart 615 accounts for more sudden changes in usage. The chart 615 of FIG. 6C includes a forecasted usage line 618, a ground truth line 621, and a long-term forecasted usage line 624. Similar to FIG. 6B, the forecasted usage line 606 and/or the long-term forecasted usage line 612 can be made up of forecasted usage values generated by the forecast engine 165 using the weight function 137 generated for individual ones of the usage measurements 135. As can be seen between comparisons of the ground truth line 621 relative to the forecasted usage line 618, the substantial variation occurring in the chart of FIG. 6B is removed, indicating that the forecasted usage is more accurate with respect to actual usage.

Based on comparisons of FIG. 6B and FIG. 6C, the spike in usage occurring in FIG. 6A is not sufficiently accounted for in the forecast of resource usage using past methods. For instance, an administrator or capacity planning service 170 analyzing the forecasted usage line 606 would see a linear increase of usage that occurs over time. This appears as though usage is slowly increasing over time. However, this does not accurately reflect the spike in usage that occurred in FIG. 6A. By employing an exponential decay of usage measurements 135 over time, a more accurate forecast of usage is generated by the forecast engine 165.

Figure 7A:
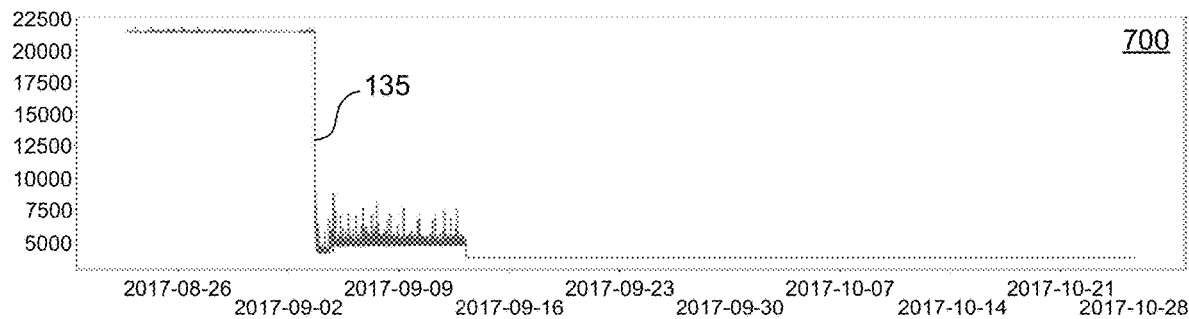
FIG. 7A is a graph showing past usage of computing resources.

FIG. 7A shows another example of a chart 700 that plots resource utilization over time. Notably, in FIG. 7A, a substantial decrease in usage occurs shortly after Sep. 2, 2017. For instance, an enterprise could have terminated processing of a new workload 150 on a computing system 106 that caused a dramatic decrease in usage of computing resources 114.

Figure 7B:
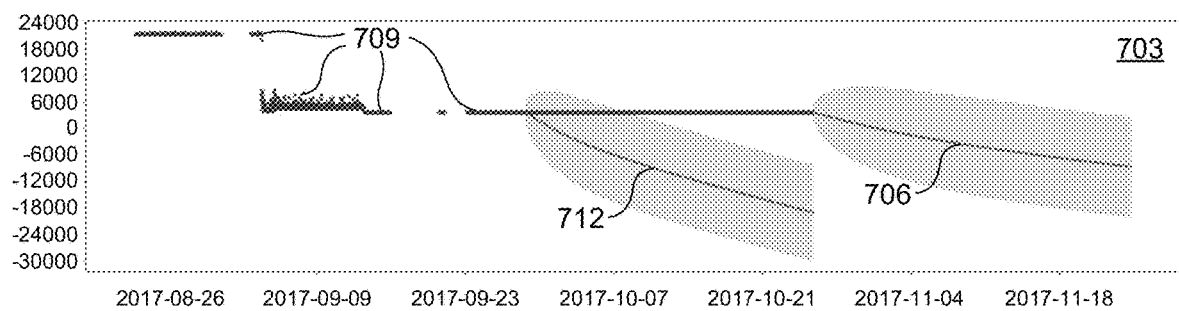
FIG. 7B is a graph showing a forecast of computing resources determined for the past usage shown in FIG. 7A, where the forecast is generated without use of an exponential decay.

In FIG. 7B, a chart 703 is shown using values generated by a legacy type of forecast engine 165 that inaccurately forecasted usage. The forecasted usage was generated by weighing each of the usage measurements 135 equally and without an exponential decay of older one of the usage measurements 135. The chart 703 includes a forecasted usage line 706, a ground truth line 709, and a long-term forecasted usage line 712. The forecasted usage line 706 and/or the long-term forecasted usage line 712 can be made up of forecasted usage values generated by the forecast engine 165, where usage measurements 135 are weighed equally. As can be seen between a comparison of the ground truth line 709 relative to the forecasted usage line 706 and the long-term forecasted usage line 712, a substantial variation exists between the actual usage and forecasted usage.

Figure 7C:
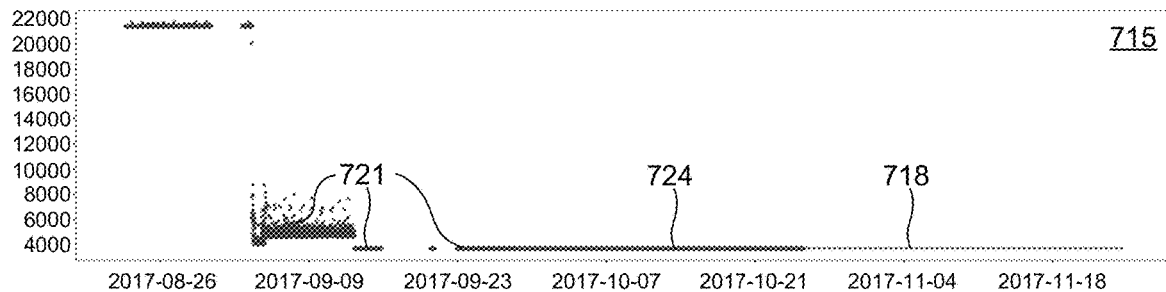
FIG. 7C is a graph showing a forecast of computing resources determined for the past usage shown in FIG. 7A, where the forecast is generated using an exponential decay weight function.

In FIG. 7C, a chart 715 is shown using values generated by the forecast engine 165 that forecasts usage in accordance with the examples described herein. For instance, the forecast engine 165 can employ the loss function 300 of FIG. 3 where older ones of the usage measurements 135 are exponentially decayed relative to newer ones of the usage measurements 135. The chart 715 of FIG. 7C includes a forecasted usage line 718, a ground truth line 721, and a long-term forecasted usage line 724. Similar to FIG. 7B, the forecasted usage line 718 and/or the long-term forecasted usage line 724 can be made up of forecasted usage values generated by the forecast engine 165 using the weight function 137 generated for individual ones of the usage measurements 135. As can be seen based on a comparison of the ground truth line 721 relative to the forecasted usage line 718, the substantial variation occurring in the chart of FIG. 7B is removed, indicating that the forecasted usage is more accurate with respect to actual usage.

Based on a comparison of FIG. 7B and FIG. 7C, the substantial drop in resource usage occurring in FIG. 7A is not sufficiently accounted for in the forecast of resource usage using past methods. For instance, an administrator or capacity planning service 170 analyzing the forecasted usage line 706 of FIG. 7B would see a linear decrease of usage that occurs slowly over time. However, this does not accurately reflect the substantial decrease in usage that occurred in FIG. 7A. By employing an exponential decay of usage measurements 135 over time, a more accurate forecast of usage is generated by the forecast engine 165.

Figure 8A:
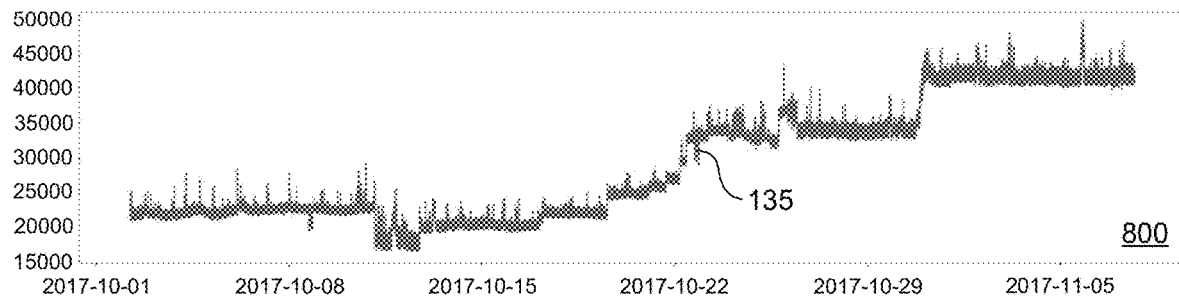
FIG. 8A is a graph showing past usage of computing resources.
Figure 8B:
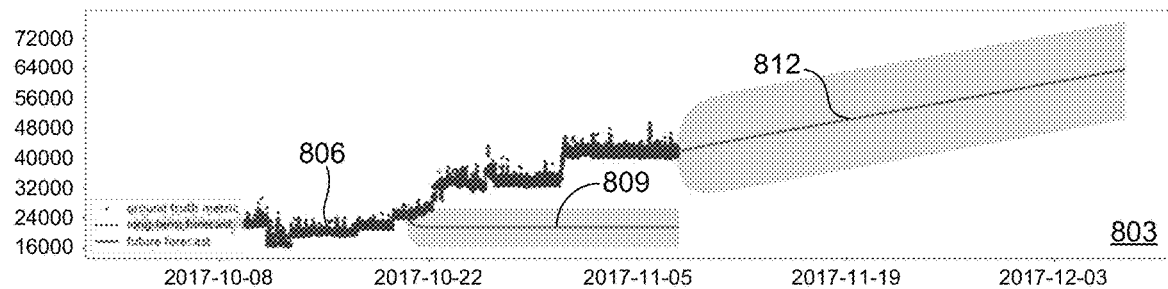
FIG. 8B is a graph showing a forecast of computing resources determined for the past usage shown in FIG. 8A, where the forecast is generated without use of an exponential decay.
Figure 8C:
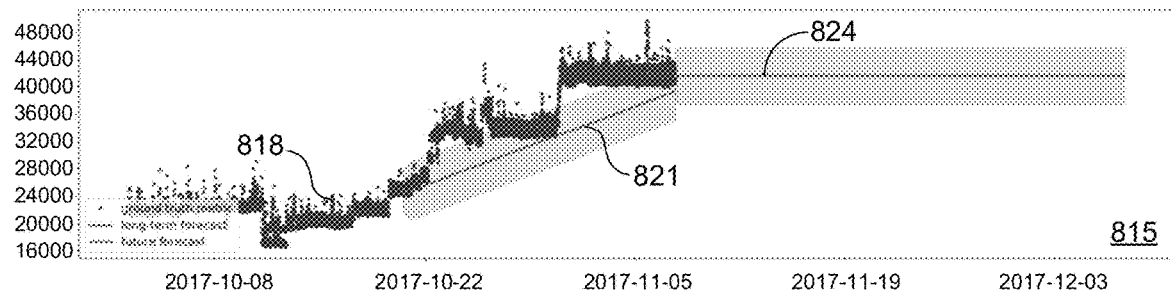
FIG. 8C is a graph showing a forecast of computing resources determined for the past usage shown in FIG. 8A, where the forecast is generated using an exponential decay weight function.

FIG. 8A includes a chart 800 showing various minor spikes in usage of computing resources 114 occurring over time. FIG. 8B includes a chart 803 illustrating traditional deficiencies in forecasting usage based on the usage measurements 135 occurring in FIG. 8A. Specifically, a substantial variation can be observed between a ground truth metric line 806 and a long-term forecasted usage line 809 as well as between the ground truth metric line 806 and a forecasted usage line 812. However, FIG. 8C includes a chart 815 plotting a forecast performed by the forecast engine 165 described in accordance with examples herein. A reduced variation is observed between a ground truth metric line 818 and a long-term forecasted usage line 821, as well as between the ground truth metric line 818 and a forecasted usage line 824.

Figure 9A:
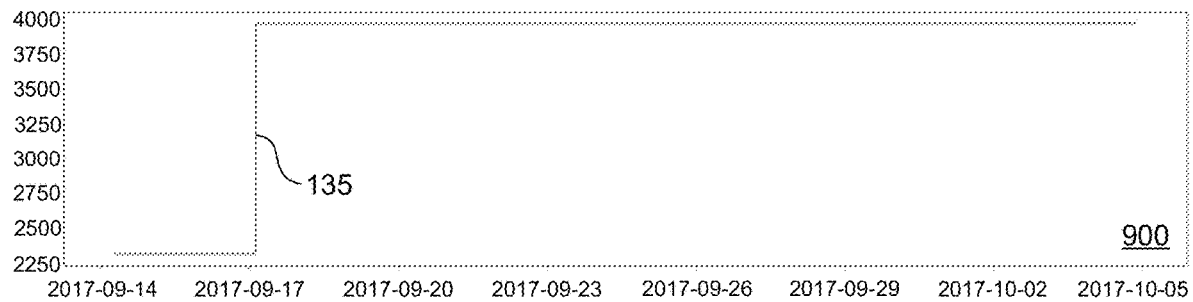
FIG. 9A is a graph showing past usage of computing resources.
Figure 9B:
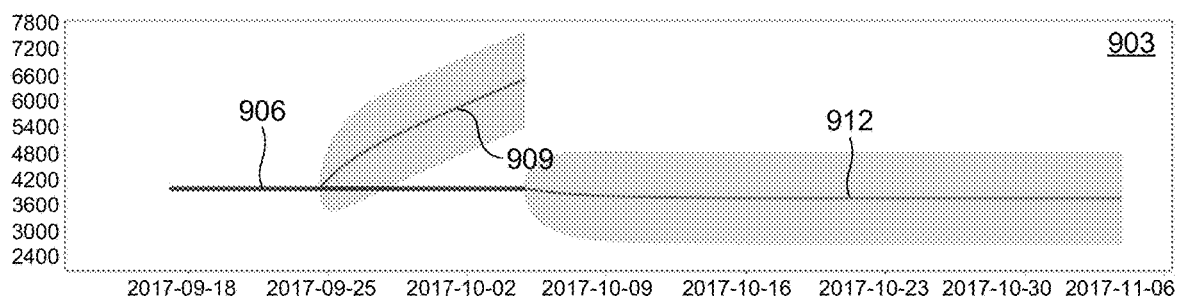
FIG. 9B is a graph showing a forecast of computing resources determined for the past usage shown in FIG. 9A, where the forecast is generated without use of an exponential decay.
Figure 9C:
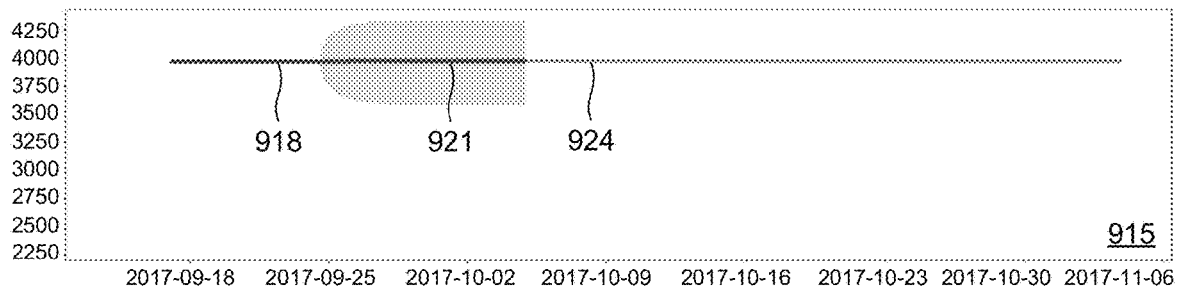
FIG. 9C is a graph showing a forecast of computing resources determined for the past usage shown in FIG. 9A, where the forecast is generated using an exponential decay weight function.

FIG. 9A includes another chart 900 showing another substantial spike in usage of computing resources 114. FIG. 9B includes a chart 903 illustrating deficiencies in forecasting usage based on the usage measurements 135 occurring in FIG. 9A. Again, a substantial variation can be observed between a ground truth metric line 906 and a long-term forecasted usage line 909, as well as between the ground truth metric line 906 and a forecasted usage line 912. However, FIG. 9C includes a chart 915 plotting a forecast performed by the forecast engine 165 described in accordance with examples herein. A notable reduction is observed in the variation between a ground truth metric line 918 and a long-term forecasted usage line 921, as well as between the ground truth metric line 918 and a forecasted usage line 924.

Figure 10A:
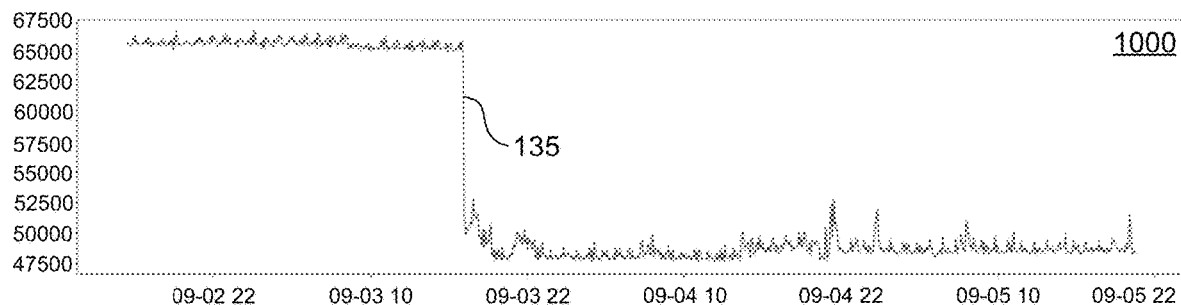
FIG. 10A is a graph showing past usage of computing resources.
Figure 10B:
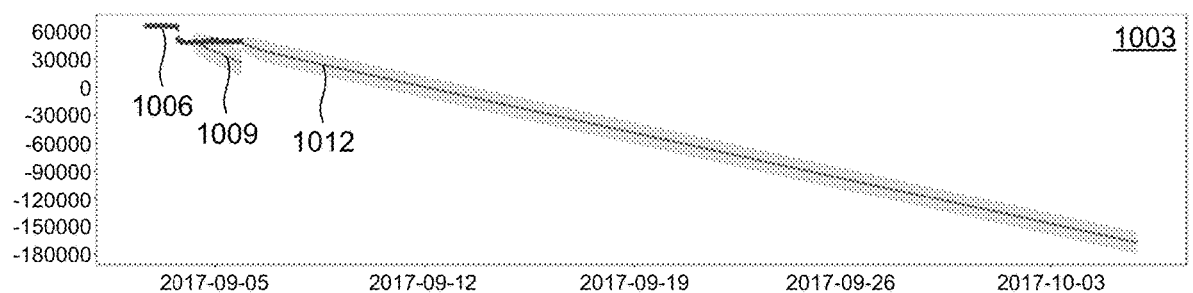
FIG. 10B is a graph showing a forecast of computing resources determined for the past usage shown in FIG. 10A, where the forecast is generated without use of an exponential decay.
Figure 10C:
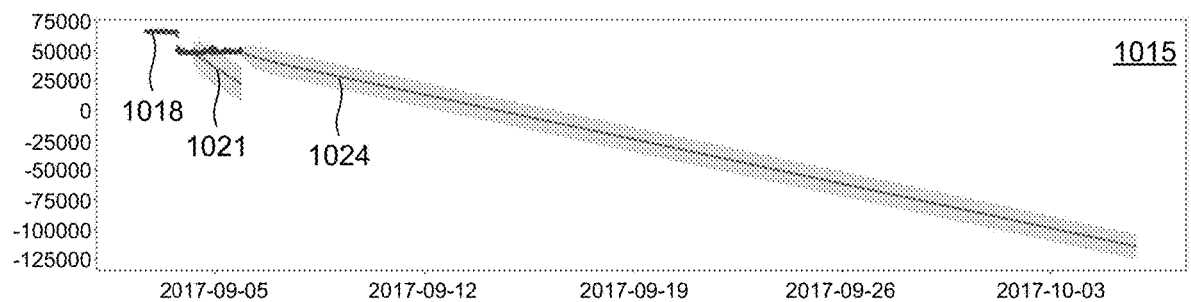
FIG. 10C is a graph showing a forecast of computing resources determined for the past usage shown in FIG. 10A, where the forecast is generated using an exponential decay weight function.

Moving along to FIG. 10A, another chart 1000 is shown showing another substantial drop in usage of computing resources 114. FIG. 10B includes a chart 1003 illustrating deficiencies in forecasting usage based on the usage measurements 135 occurring in FIG. 10A. A substantial variation can be observed between a ground truth metric line 1006 and a long-term forecasted usage line 1009, as well as between the ground truth metric line 1006 and a forecasted usage line 1012. FIG. 10C, however, includes a chart 1015 plotting a forecast performed by the forecast engine 165 described in accordance with examples herein. A notable reduction is observed in the variation between a ground truth metric line 1018 and a long-term forecasted usage line 1021, as well as between the ground truth metric line 1018 and a forecasted usage line 1024.

Figure 11:
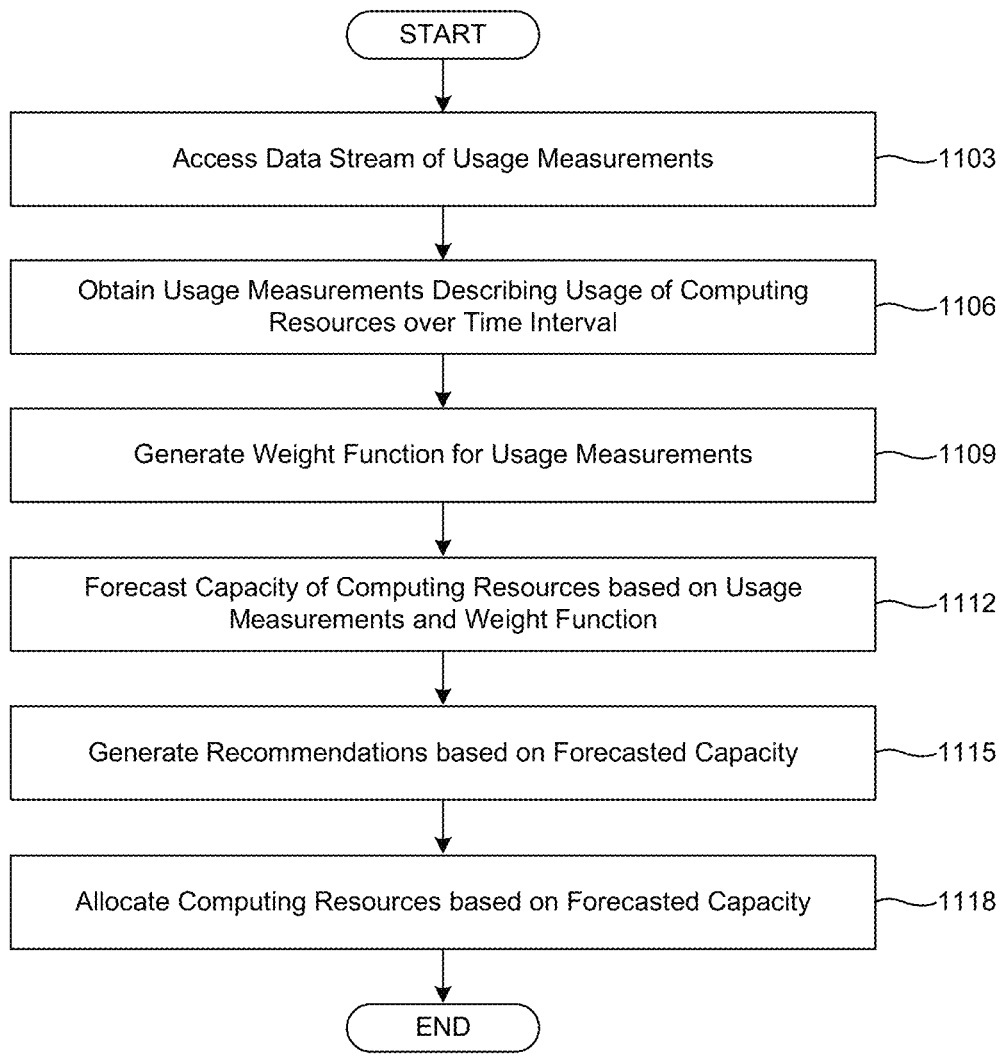
FIG. 11 is a flowchart illustrating functionality implemented by components of the networked computing environment of FIG. 1.

Moving on to FIG. 11, a flowchart is shown that provides one example of the operation of a portion of the networked environment 100. The flowchart of FIG. 11 can be viewed as depicting an example of elements of a method implemented by the computing environment management service 140 or the forecast engine 165 executing in the computing environment 103 according to one or more examples. The separation or segmentation of functionality as discussed herein is presented for illustrative purposes only.

In step 1103, the computing environment 103 can access a data stream of usage measurements 135. In some examples, the data stream can include usage measurements 135 generated by a data measurement service 160, where the data stream is made available to various third-party applications and services, such as the forecast engine 165. For instance, the data measurement service 160 can generate a data stream of usage measurements 135 having metric data 136 and a timestamp 139 for a computing service 113 periodically, such as every five minutes or other suitable time. The metric data 136 can include one or more numerical values describing an amount of disk space, memory, CPU, or other computing resource 114 in use at a given time, where the time is identifiable from the timestamp 139.

In step 1106, the computing environment 103 can obtain usage measurements 135 describing usage of computing resources 144 over a time interval. For instance, the usage measurements 135 can be obtained from the data stream accessed in step 1103. In some examples, the usage measurements 135 can be obtained from a data stream generated in near real-time as the computing resources 114 operate.

In some examples, the forecast engine 165 can include one or more user interfaces 500 that enables an administrator to create one or more metric processors from configurable models, such as the loss function 300 of FIG. 3, and assign a single data stream of usage measurements 135 to each metric processor. The computing environment management service 145 can assign each metric processor with a registration key that can be used to route a data stream including usage measurements 135 for a particular one of the computing resources 114 to a corresponding metric processor. Each usage measurement 135 obtained from the data stream can be copied to the data store 131 to create a history for each computing resource 114. The metric processor can generate a forecast when the forecast engine 165 receives a forecast request, for instance, when the user interface 500 of FIG. 5 is accessed by an administrator. In response to a forecast request being received, the forecast engine 165 can access usage measurements 135 from the data stream to forecast usage of computing resources 114 required by the computing services 113 at a future time.

To forecast usage, in step 1109, the computing environment 103 can generate a weight function 137 for individual ones of the usage measurements 135 obtained in step 1106. In some examples, the weight function 137 can include an exponential weight function, such as the one described in eq. 1. For instance, the computing environment 103 can generate a weight function 137 for individual ones of the usage measurements 135 such that new ones of the usage measurements 135 in a time interval are assigned a weight exponentially higher than older ones of the usage measurements 135, for instance, based on a timestamp 139 generated for each of the usage measurements 135. In other words, the weight function 137 can exponentially decay the usage measurements 135 by assigning a weight to respective ones of the usage measurements 135 based on a corresponding timestamp 139, wherein a more recent timestamp 139 is more heavily weighted than an older timestamp 139.

In some examples, the weight can be generated to be less than a preconfigured weight threshold. For instance, in examples in which the forecast engine 165 is a forecast engine library, the preconfigured weight threshold can include a hyper-parameter or an input variable that can be configured by a programmer or other information technology (IT) professional.

In step 1112, the computing environment 103 can forecast capacity of computing resources 114 based on the usage measurements 135 and the weight function 137. The future capacity of the computing resources forecasted can include at least one of a central processing unit (CPU) demand, a memory demand, a disk demand, or demand for another computing resource 114. In some examples, capacity can include a resource utilization metric. The resource utilization metric can include a mean forecast given by:

$$g_{n+l} = \frac{1}{l} \sum_{j=1}^{l} \hat{z}_{n+j}, \quad \text{(eq. 2)}$$

where an upper configured value is given by:

$$uc_{n+l} = \hat{z}_{n+l} + C\sigma(l) \quad \text{(eq. 3)},$$

or a lower confidence value given by:

$$lc_{n+l} = \hat{z}_{n+l} - C\sigma(l) \quad \text{(eq. 4)}$$

where C is a prediction interval coefficient and $\sigma(l)$ is an estimated standard deviation of the l-th lead time in the forecast time interval. As can be appreciated, based on the resource utilization metric, an administrator or an automated capacity planning service 170 can allocate or deallocate computing resources 114. As such, the future capacity of the computing resources 114 can be forecasted and updated in near real-time as new usage measurements 135 are received in the data stream of usage measurements 135.

As the forecast engine 165 generates and uses a weight function 137 that causes older ones of the usage measurements 135 to have a weight exponentially lower than new ones of the usage measurements 135, older ones of the usage measurements 135 are eventually phased out of use in forecasting usage. More recent ones of the usage measurements 135 are afforded greater weight, and as such, substantial increases or decreases in usage of the computing resources 114 can be accounted for more quickly in usage forecasts and allocations of computing resources 114.

In step 1115, the computing environment 103 can generate one or more recommendations based on the forecasted capacity. Recommendations can include a suggestion that assists an administrator or an automated capacity planning service 170 in allocating an ideal amount of computing resources 114 in a computing environment 103. As such, the recommendations can include a time remaining recommendation, an estimated time remaining recommendation, or other recommendation advising the administrator to make a change (or abstain from making a change) based on a forecasted usage. The estimated time remaining recommendation can include an estimated time remaining until a computing resource 114 is exhausted based on the usage measurements 135 and the weight function 137. Additionally, in some examples, the forecast engine 165 can determine a right size recommendation that suggests usable capacities of computing resources 114 used to run a computing service 113.

In step 1118, the computing environment 103 can allocate computing resources 114 based on the forecasted capacity and/or the recommendations generated in step 1115. For instance, if the recommendation determined in step 1115 indicates that additional resources should be allocated based on a forecasted usage, the administrator, through the capacity planning service 170, can allocate more computing resources 114. Alternatively, if the recommendation determined in step 1115 indicates that too many computing resources 114 have been allocated based on a forecasted usage, the administrator, through the capacity planning service 170, can free-up or deallocate computing resources 114. In some examples, the capacity planning service 170 is automated and performs right sizing tasks autonomously and without input from an administrator. Thereafter, the process can proceed to completion.

In some examples, the exponential decay is only applied to non-periodic portions of usage measurements 135. For instance, in some examples, the forecast engine 135 can identify periodic and non-periodic portions of usage measurements 135 obtained from the data stream. If a periodic component is detected, it is understood that superimposing the periodic component does not work onto a stochastic forecast over exponential decay. As such, in some examples, the loss function 200 of FIG. 2 is used only for periodic components while the loss function 300 of FIG. 3 is used for non-periodic components of the usage measurements 135.

Figure 12:
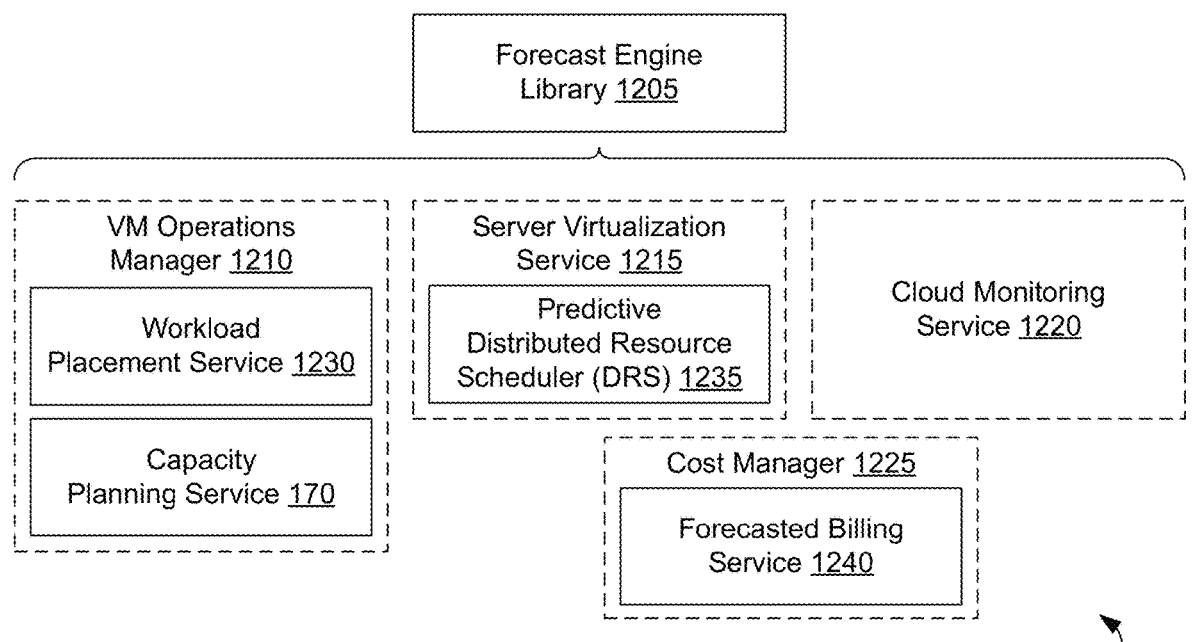
FIG. 12 is a schematic diagram illustrating a forecast engine of the networked computing environment of FIG. 1 as a forecast engine library.

Referring next to FIG. 12, a schematic diagram 1200 is shown that includes a forecast engine library 1205. While in some examples, the forecast engine 165 can include an application or service executing independently in the computing environment 103, in other examples, the forecast engine 165 can include a forecast engine library 1205. As such, various applications and services can include the forecast engine library 1205 to call routines of the forecast engine library 1205 that forecast usage and perform other operations described herein.

As a non-limiting example, the forecast engine library 1205 can be invoked by a virtual machine operations manager 1210, a server virtualization service 1215, a cloud monitoring service 1220, a cost manager 1225, or other service. The virtual machine operations manager 1210 can include an application or service that oversees tasks performed by virtual machines 126 executing in the computing environment 103. As such, the virtual machine operations manager 1210 can include a workload placement service 1230, a capacity planning service 170, as well as other services not described herein. The virtual machine operations manager 1210 can invoke the forecast engine library 1205 to forecast usage for capacity planning and placement of workloads 150 to maintain a balanced distributed computing environment.

The server virtualization service 1215 can include a service that virtualizes server computing devices and offers access to virtual servers through a network-based API. As such, an enterprise can rent a virtual server as opposed to purchasing and maintaining a physical server on-premises. In some examples, the server virtualization service 1215 includes a predictive distributed resource scheduler (DRS) 1235. The predictive DRS 1235 can balance workloads 150 with available resources in a virtualized computing environment 130. In some examples, an administrator can use the predictive DRS 1235 to define rules for allocation of physical resources among virtual machines 126. Pools of computing resources 114 can be added, removed, or reorganized, and different pools of computing resources 114 can be assigned to different business units. If the workload 150 on one or more virtual machines 126 changes, the predictive DRS 1235 can redistribute virtual machines 126 among the physical servers 115 in a computing system 106. For instance, if an overall workload 150 decreases, some of the physical servers 115 can be temporarily powered-down and the workload 150 can be consolidated. The predictive DRS 1235 can thus invoke the forecast engine library 1205 to forecast usage to perform a redistribution of virtual machines 126 among servers 115.

The cloud monitoring service 1120 permits administrators to evaluate, monitor, and manage cloud-based services, applications, and infrastructure. For instance, the cloud monitoring service 1120 can allow administrators to monitor and configure public, private, or hybrid cloud environments. The cloud monitoring service 1120 can use the forecast engine library 1205 to evaluate the computing resources 114 used by a cloud environment and suggest recommendations on whether the cloud environment requires additional or less computing resources 114.

The cost manager 1225 can provide estimated expenses for use of computing resources 114. For instance, the cost manager 1225 can include a forecasted billing service 1240 that permits an administrator to forecast or estimate billing costs that will be incurred by an enterprise based on usage of computing resources 114. The forecasted billing service 1240 can invoke the forecast engine library 1205 to forecast usage of the computing resources 114.

Figure 13:
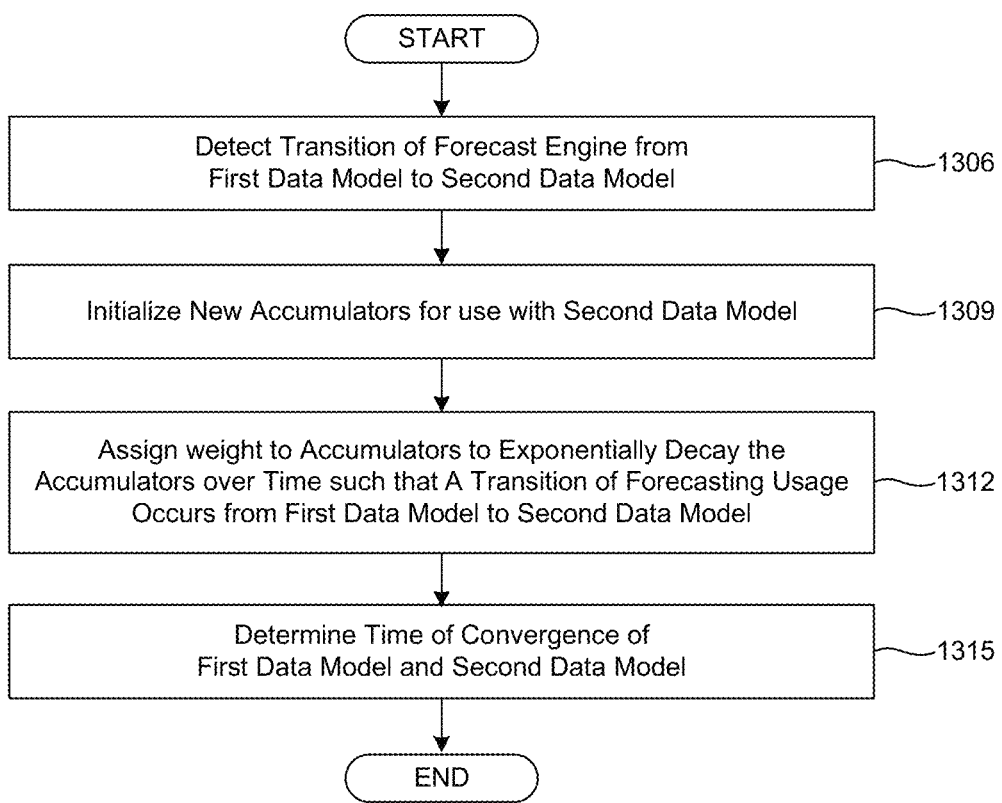
FIG. 13 is a flowchart illustrating functionality implemented by components of the networked computing environment of FIG. 1.

Moving on to FIG. 13, a flowchart is shown that provides one example of the operation of a portion of the networked environment 100. The flowchart of FIG. 13 can be viewed as depicting an example of elements of a method implemented by the computing environment management service 140 or the forecast engine 165 executing in the computing environment 103 according to one or more examples. The separation or segmentation of functionality as discussed herein is presented for illustrative purposes only.

In some examples, the forecast engine 165 includes one or more metric processors that utilize configurable models, such as the loss function 200 of FIG. 2. Each of the metric processors can include a component referred to as an accumulator, where the accumulator includes a service or a data object that maintain a sum of usage measurements 135 obtained over a time interval. As usage measurements 135 are received from a data stream, the accumulator is incremented accordingly to maintain a usage history for a time interval in an efficient manner in terms of memory usage.

It is desirable for the computing environment 103 to have a 100% uptime, or uptime substantially close to 100%. As such, it is not ideal to erase or reload history that has been stored by the accumulators and metric processors, nor is it desirable to terminate execution of the metric processors as a data stream will continue to provide usage measurements 135. As such, FIG. 13 includes an example for transitioning the forecast engine to an exponential decay model without incurring downtime, loss of data, or a reloading of data.

Beginning with step 1306, the computing environment 103 detects a transition of the forecast engine 165 from use of a first data model to a second data model. For instance, the computing environment 103 can detect an upgrade of the forecast engine 165 from a current version to a new version, where the current version employs the loss function 200 of FIG. 2, and the new version of the forecast engine 165 employs the loss function 300 of FIG. 3.

In step 1309, the computing environment 103 can initialize new accumulators needed for use with the second data model. It is understood that the computing environment 103 continues to maintain accumulators that were obtained using the forecast engine 165 when the forecast engine 165 employed the first data model in forecasting usage. The computing environment 103 can initialize new metric processors in some examples that maintain an accumulator as a data object.

In step 1312, the computing environment 103 can assign a weight to the accumulators to exponentially decay the accumulators over time such that a transition of forecasting usage occurs from first data model to second data model. For instance, as soon as an enterprise upgrades the forecast engine 165 from a legacy version to a new version, the forecasted usage would appear similar to the legacy version of the forecast engine 165 using the first data model. As a result, the enterprise does not receive an immediate recommendation or require an immediate action on capacity planning, which can be problematic. However, as more usage measurements 135 are received from the data stream, the accumulators used for the first data model are decayed exponentially. Over a certain time period, the results transition smoothly to computations made with the second data model.

The forecast engine 165 can thus forecast usage, as detailed in step 1113, based on a combination of the first data model and the second data model, where the first data model can include the loss function 200 of FIG. 2, and the second data model can include the loss function 300 of FIG. 3.

In step 1315, the computing environment 103 can determine a time of convergence of the forecasted usage results from the first data model to the second data model. In some examples, the time of convergence can be specified by the administrator such that the forecasted usage results are transitioned to that of the second data model by a predetermined time. In some examples, convergence of the forecasted usage results from the first data model to the second data model can be defined as the time when the proportion of weight assigned to a time window equals a predefined target, such as 99% or other suitable target.

In some examples, the forecast engine library 1205 can include a routine or a function that can receive, as inputs, an effective window size, past usage measurements 135 received in a time window, and a total number of usage measurements 135 used as data points. The routine or function can output a time at which the forecasted usage results will fully transition from use of the first data model to the second data model.

In some examples, convergence can be achieved to a desired tail-weight ratio (TWR), meaning that all the forecasts that are being computed using the second data model also converge to the forecasts made using first data model. The tail-weight ratio is given by:

$$\lim_{N \to \infty} \frac{\sum_{i=1}^{k} c^i}{\sum_{i=1}^{\infty} c^i} = 1 - c^k, \quad \text{(eq. 5)}$$

where k is an effective window size, and N is an aggregated metric determined for a data stream.

It is desired to determine a value of k that achieves a certain tail-weight ratio, where k can be a parameter of the forecast engine library 1205. For instance, assume it is desired for a time window k to have a tail-weight ratio of 99%. However, the $$\lim_{N \to \infty}$$

portion of eq. 4 assumes a batch setting with a very large sample size, which is not the case in a streaming setting where usage measurements 135 are received from a data stream. As such, the tail-weight ratio can instead be expressed as a function:

$$TWR(c, k, N) = \frac{\sum_{i=1}^{k} c^i}{\sum_{i=1}^{N} c^i} = \frac{\sum(c, k, N)}{1 - c^N}. \quad \text{(eq. 6)}$$

The numerator can include a piecewise function with critical point at k=N. This function can be defined as:

$$\sum(c, k, N) = \begin{cases} 0 & N = 0 \\ 1 - c^N & N < k \\ 1 - c^k & N > k \end{cases} \quad \text{(eq. 7)}$$

The pseudocode for eq. 7 is shown below:

```
In [3]: def sck(c, k, N):
            assert (c < 1)
            assert (k > 0)
            assert (N > 0)
            assert (c > 0)
            if N == 0:
                return 0
            elif N < k:
                return 1 - c**N
            else:
                return 1 - c**k
In [4]: def twr_orig(c, k, N):
            assert (c < 1)
            assert (k > 0)
            assert (N > 0)
            assert (c > 0)
            return sck(c, k, N)/(1 - c**N)
```

Consider the case where the desired tail-weight ratio is 99% (TWR=0.99) and k=1 month (30*288). The evolution of the tail-weight ratio can be seen as additional usage measurements 135 are received in a data stream and N progresses over two months.

```
In [5]: k = 30*288
        c = 0.99946
In [6]: twr = [ ]
            for N in range(60*288):
                twr.append(twr_orig(c, k, N+1))
```

Figure 14:
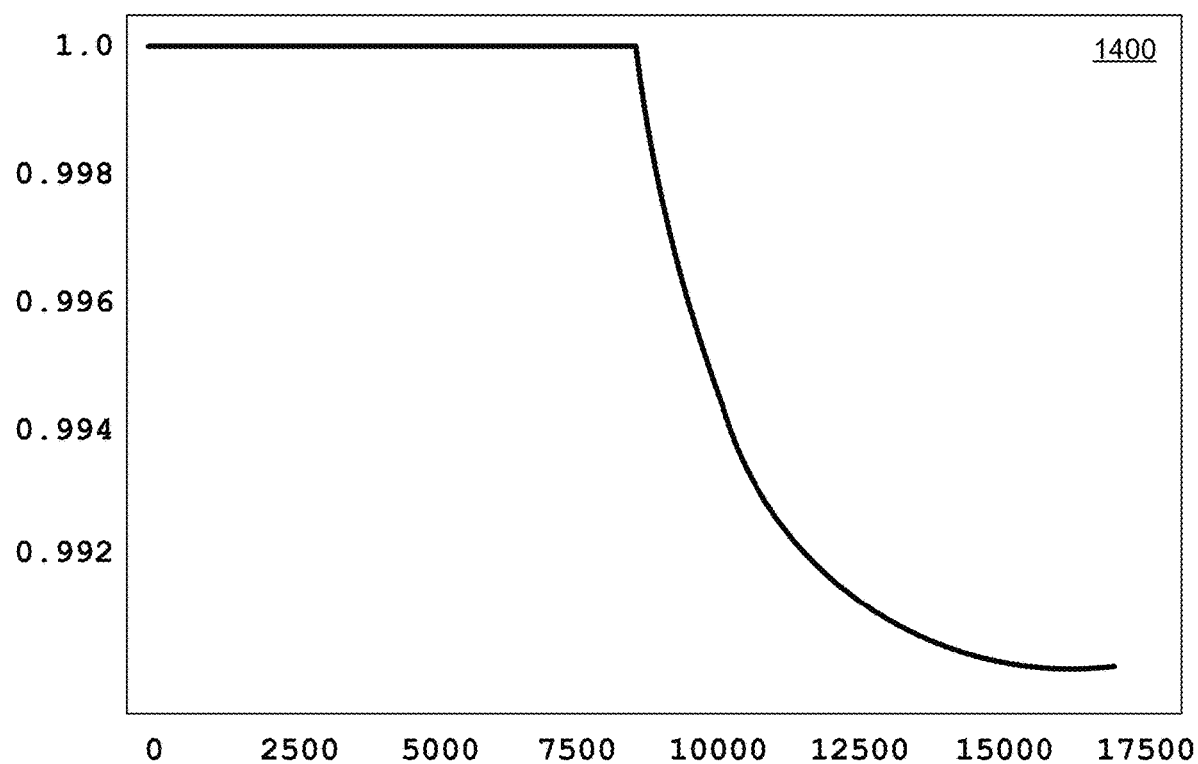
FIGS. 14 and 15 are graphs illustrating a convergence of a forecast engine utilizing a first data model to a forecast engine utilizing a second data model.

FIG. 14 includes a graph 1400 showing when the tail-weight ratio converges to 99% (0.99). Referring back to FIG. 13, now that a notation has been expressed for tail-weight ratio, an analytical form for the upgrade case can be determined. It is desired to quantify how the weight distribution changes after the upgrade of the forecast engine 165 while also quantifying when the tail-weight ratio converges to the desired second data model. As such, the tail weight ratio can be expressed as a function of c, k, N, and t, where t is the time at which the upgrade occurs.

Figure 15:
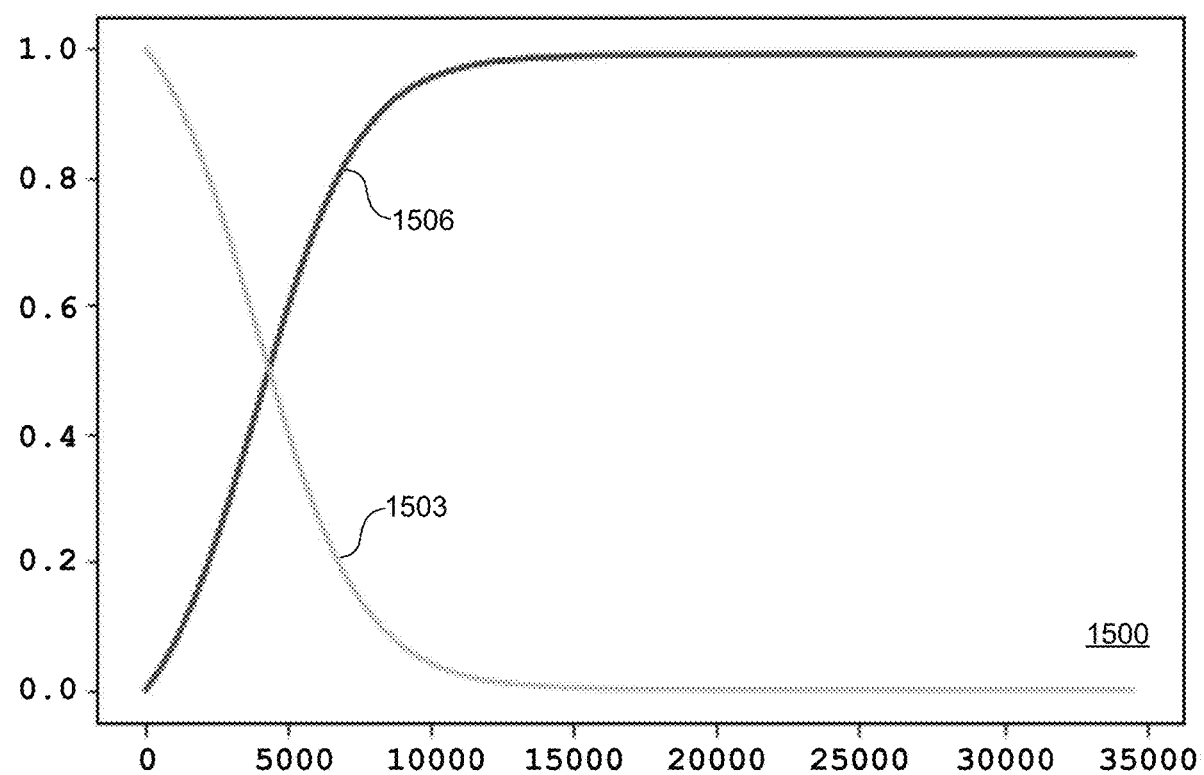

FIG. 15 includes a graph 1500 showing a first line 1503 and a second line 1506 converging. For instance, the first line 1503 represents forecasted usage of computing resources 114 determined using the first data model, where the first line 1503 is exponentially decayed and eventually phased out of use in forecasting usage. The second line 1506 represents forecasted usage of computing resources 114 determined using the second data model. As can be seen in the graph 1500, the values of the first line 1503 decrease exponentially, showing the phase out of use of the older forecasted values. Additionally, the values of the second line 1603 increase exponentially, showing the phase in of use of the newer forecasted values. This continues until forecasted values generated using the second data model are exclusively used. Thereafter, the process can proceed to completion.

Stored in the memory device are both data and several components that are executable by the processor. Also stored in the memory can be a data store 131 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be electric or of some other available construction.

Client devices 109 can be used to access user interfaces generated to configure or otherwise interact with the computing environment management service 140. These client devices 109 can include a display upon which a user interface generated by a client application for providing a virtual desktop session (or other session) can be rendered. In some examples, the user interface can be generated using user interface data provided by the computing environment 103. The client device 109 can also include one or more input/output devices that can include, for example, a capacitive touchscreen or other type of touch input device, fingerprint reader, or keyboard.

Although the computing environment management service 140, the data measurement service 160, the forecast engine 165, the capacity planning service 170, and other various systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for forecasting capacity of a computing environment, comprising:
    at least one computing device;
    program instructions stored in memory and executable in the at least one computing device that, when executed by the at least one computing device, direct the at least one computing device to:
        obtain a plurality of usage measurements describing usage of a plurality of computing resources of the computing environment over a time interval;
        generate a weight function for individual ones of the usage measurements, wherein the weight function exponentially decays the usage measurements based on a respective time period at which the usage measurements were obtained; and
        forecast a future capacity of the computing resources based on the usage measurements and the weight function assigned to the individual ones of the usage measurements.

2. The system of claim 1, wherein the weight function exponentially decays the usage measurements by assigning a weight to respective ones of the usage measurements based on a timestamp, wherein a more recent timestamp is more heavily weighted than an older timestamp.

3. The system of claim 1, wherein:
    the usage measurements are obtained from a data stream of usage measurements, the data stream of usage measurements being generated in near real-time as the computing resources operate; and
    the future capacity of the computing resources is forecasted and updated in near real-time as new usage measurements are received in the data stream of usage measurements.

4. The system of claim 2, wherein:
    the weight is generated to be less than a preconfigured weight threshold; and
    the future capacity of the computing resources forecasted comprises at least one of: a central processing unit (CPU) demand, a memory demand, and a disk demand.

5. The system of claim 1, wherein:
    the future capacity and the weight function is generated by a forecast engine; and
    the at least one computing device is further directed to detect a transition of the forecast engine from a first data model to a second data model, the second data model utilizing the weight function.

6. The system of claim 5, wherein the at least one computing device is further directed to:
    maintain a first plurality of accumulators for use with the first data model;
    in response to the transition of the forecast engine being detected, initialize a second plurality of accumulators for use with the second data model; and
    as usage measurements are received in a stream of usage measurements, exponentially decay the first plurality of accumulators until the first plurality of accumulators are not used in subsequent forecasts of usage by the forecast engine.

7. The system of claim 6, wherein the at least one computing device is further directed to determine a time of convergence of forecasts using the first data model and forecasts using the second data model.

8. A non-transitory computer-readable medium for forecasting capacity of a computing environment, comprising program code executable in at least one computing device that, when executed by the at least one computing device, directs the at least one computing device to:
    obtain a plurality of usage measurements describing usage of a plurality of computing resources of the computing environment over a time interval;
    generate a weight function for individual ones of the usage measurements, wherein the weight function exponentially decays the usage measurements based on a respective time period at which the usage measurements were obtained; and forecast a future capacity of the computing resources based on the usage measurements and the weight function assigned to the individual ones of the usage measurements.

9. The non-transitory computer-readable medium of claim 8, wherein the weight function exponentially decays the usage measurements by assigning a weight to respective ones of the usage measurements based on a timestamp, wherein a more recent timestamp is more heavily weighted than an older timestamp.

10. The non-transitory computer-readable medium of claim 8, wherein:
the usage measurements are obtained from a data stream of usage measurements, the data stream of usage measurements being generated in near real-time as the computing resources operate; and
the future capacity of the computing resources is forecasted and updated in near real-time as new usage measurements are received in the data stream of usage measurements.

11. The non-transitory computer-readable medium of claim 9, wherein:
the weight is generated to be less than a preconfigured weight threshold; and
the future capacity of the computing resources forecasted comprises at least one of: a central processing unit (CPU) demand, a memory demand, and a disk demand.

12. The non-transitory computer-readable medium of claim 8, wherein:
the future capacity and the weight function is generated by a forecast engine; and
the at least one computing device is further directed to detect a transition of the forecast engine from a first data model to a second data model, the second data model utilizing the weight function.

13. The non-transitory computer-readable medium of claim 12, wherein the at least one computing device is further directed to:
maintain a first plurality of accumulators for use with the first data model;
in response to the transition of the forecast engine being detected, initialize a second plurality of accumulators for use with the second data model; and
as usage measurements are received in a stream of usage measurements, exponentially decay the first plurality of accumulators until the first plurality of accumulators are not used in subsequent forecasts of usage by the forecast engine.

14. The non-transitory computer-readable medium of claim 13, wherein the at least one computing device is further directed to determine a time of convergence of forecasts using the first data model and forecasts using the second data model.

15. A computer-implemented method for forecasting capacity of a computing environment, comprising:

obtaining a plurality of usage measurements describing usage of a plurality of computing resources of the computing environment over a time interval;

generating a weight function for individual ones of the usage measurements, wherein the weight function exponentially decays the usage measurements based on a respective time period at which the usage measurements were obtained; and forecasting a future capacity of the computing resources based on the usage measurements and the weight function assigned to the individual ones of the usage measurements.

16. The computer-implemented method of claim 15, wherein the weight function exponentially decays the usage measurements by assigning a weight to respective ones of the usage measurements based on a timestamp, wherein a more recent timestamp is more heavily weighted than an older timestamp.

17. The computer-implemented method of claim 15, wherein:
the usage measurements are obtained from a data stream of usage measurements, the data stream of usage measurements being generated in near real-time as the computing resources operate; and
the future capacity of the computing resources is forecasted and updated in near real-time as new usage measurements are received in the data stream of usage measurements.

18. The computer-implemented method of claim 16, wherein:
the weight is generated to be less than a preconfigured weight threshold; and
the future capacity of the computing resources forecasted comprises at least one of: a central processing unit (CPU) demand, a memory demand, and a disk demand.

19. The computer-implemented method of claim 18, wherein:
the future capacity and the weight function is generated by a forecast engine; and
the computer-implemented method further comprising detecting a transition of the forecast engine from a first data model to a second data model, the second data model utilizing the weight function.

20. The computer-implemented method of claim 19, further comprising:
maintaining a first plurality of accumulators for use with the first data model;
in response to the transition of the forecast engine being detected, initializing a second plurality of accumulators for use with the second data model;
as the usage measurements are received in a stream of usage measurements, exponentially decaying the first plurality of accumulators until the first plurality of accumulators are not used in subsequent forecasts of usage by the forecast engine; and
determining a time of convergence of forecasts using the first data model and forecasts using the second data model.

* * * * *